United States Patent
Doyle

(10) Patent No.: US 10,184,042 B2
(45) Date of Patent: Jan. 22, 2019

(54) HIGH PERFORMANCE POLYURETHANE PREPOLYMER AND CURING COMPOSITIONS

(71) Applicant: Chemtura Corporation, Middlebury, CT (US)

(72) Inventor: Thomas R. Doyle, Wallingford, CT (US)

(73) Assignee: LANXESS SOLUTIONS US INC., Middlebury, CT (US)

(*) Notice: Subject to any disclaimer, the term of this patent is extended or adjusted under 35 U.S.C. 154(b) by 169 days.

(21) Appl. No.: 15/339,989

(22) Filed: Nov. 1, 2016

(65) Prior Publication Data

US 2017/0137602 A1    May 18, 2017

Related U.S. Application Data

(60) Provisional application No. 62/256,251, filed on Nov. 17, 2015.

(51) Int. Cl.

| | | |
|---|---|---|
| C08K 5/00 | (2006.01) | |
| C08K 5/11 | (2006.01) | |
| C08K 5/12 | (2006.01) | |
| C08G 18/10 | (2006.01) | |
| C08G 18/22 | (2006.01) | |
| C08G 18/32 | (2006.01) | |
| C08G 18/42 | (2006.01) | |
| C08G 18/48 | (2006.01) | |
| C08G 18/76 | (2006.01) | |

(52) U.S. Cl.
CPC ............... *C08K 5/11* (2013.01); *C08G 18/10* (2013.01); *C08G 18/222* (2013.01); *C08G 18/3268* (2013.01); *C08G 18/42* (2013.01); *C08G 18/4277* (2013.01); *C08G 18/48* (2013.01); *C08G 18/7671* (2013.01); *C08K 5/0016* (2013.01); *C08K 5/12* (2013.01)

(58) Field of Classification Search
CPC .. C08G 18/10; C08G 18/3268; C08G 18/222; C08G 18/7671; C08G 18/42; C08G 18/4277; C08G 18/48; C08K 5/11; C08K 5/0016; C08K 5/12
USPC ........................................................ 524/298
See application file for complete search history.

(56) References Cited

U.S. PATENT DOCUMENTS

| | | |
|---|---|---|
| 3,755,261 A | 8/1973 | VanGlick |
| 3,876,604 A | 4/1975 | Caruso et al. |
| 3,888,831 A | 6/1975 | Kogon |
| 4,207,128 A | 6/1980 | Träubel et al. |
| 4,282,344 A | 8/1981 | Caruso |
| 4,716,070 A | 12/1987 | Duck et al. |
| 5,872,193 A | 2/1999 | Narayan et al. |
| 2015/0087797 A1 | 3/2015 | Doyle et al. |

OTHER PUBLICATIONS

PCT International Search Report and Written Opinion dated Jan. 18, 2017 from corresponding Application No. PCT/US2016/059831, 11 pages.

*Primary Examiner* — Angela C Scott
(74) *Attorney, Agent, or Firm* — Dilworth IP, LLC

(57) ABSTRACT

Compositions comprising isocyanate capped polyurethane prepolymers and select mono-benzyl phthalate plasticizers, e.g., 7-(2,6,6,8-tetramethyl-4-oxa-3-oxo-nonyl) benzylphthalate, exhibit better isocyanate stability than prepolymer compositions comprising other plasticizers common in polyurethane systems. Curing compositions comprising these prepolymers, the select mono-benzyl phthalate plasticizers, and methylenedianiline coordination complex curing agents exhibit improved processing characteristics and yield elastomeric polyurethanes with lower compression set, higher break strength and lower color than similar composition comprising plasticizers such as benzoate plasticizers.

20 Claims, No Drawings

HIGH PERFORMANCE POLYURETHANE PREPOLYMER AND CURING COMPOSITIONS

Compositions comprising an isocyanate capped prepolymer and a select mono-benzyl phthalate plasticizer such as benzyl texanol phthalate exhibit much improved isocyanate stability, produce curing compositions with increased storage stability or pot life when combined with methylenedianiline metal salt coordination complexes, and which upon cure provide elastomers with improved physical properties over compositions comprising the same prepolymer with other common plasticizers, such as benzoate plasticizers.

BACKGROUND OF THE INVENTION

High performance elastomeric polyurethanes prepared from isocyanate capped prepolymers by curing with methylenedianiline metal salt coordination complexes (MDA-CC) are known. For example, U.S. Pat. Nos. 3,755,261, 3,876,604 and 4,282,344 disclose the use of a MDA-CC, e.g., a 3:1 NaCl:MDA complex, as a blocked curative that can be mixed with prepolymers at low temperature to form curing compositions with long pot lives when kept at temperatures below the decomposition temperature of the MDA-CC. When heated above the activation temperature, i.e., the decomposition temperature of the coordination complex, the highly reactive MDA is released and reacts with the prepolymer to form high performance elastomeric polyurethane products.

Phase separation between soft and hard segments in a polyurethane elastomer is believed to play an important role in providing the excellent mechanical properties in high performance elastomers. The soft segment of a polyurethane is associated with the portion of the polymer derived from the polyol used in its preparation. Symmetrical prepolymers, such as symmetrical prepolymers prepared from a polyol and MDI capped, for example, MDI prepolymers having a low amount of fee MDI monomer (LFM prepolymers), are known to provide high performance elastomeric materials when cured with MDA-CC. The outstanding mechanical properties of these elastomers have been attributed in large part to the symmetrical MDI-MDA hard segment, which gives excellent phase separation.

Certain prepolymers used in the formation of high performance polyurethane elastomers are made from high molecular weight polyols and have a low isocyanate, e.g., isocyanate content of 4% or less. The high molecular weight polyol helps to enhance phase separation, but can also increase the possibility of "cold hardening", a situation where at room temperature the material comprising the soft segment crystallizes and thus becomes harder. Plasticizers can be added to prevent cold hardening from occurring.

A variety of plasticizers are well known in polyurethane systems. For example, U.S. Pat. No. 5,872,193 discloses a polyisocyanate prepolymer composition prepared by reacting diphenylmethane diisocyanate with an active hydrogen containing compound having a number average molecular weight of at least about 2000, wherein the reaction is carried out in the presence of a diluent capable of maintaining the average viscosity of the resulting prepolymer below about 500 cps at 25° C. The diluent is typically a plasticizer and a large number of useful plasticizers are listed, including adipates, phthalates, benzoates, azelaic acid derivatives, citrates, epoxy derivatives of naturally occurring oils such as epoxidized soybean oil and epoxidized linseed oil, glycol esters, polyethylene glycols, oleic acid derivatives and various phosphoric acid esters and others. Specifically named phthalic acid derivatives include dimethyl phthalate, dibutyl phthalate, butyl octyl phthalate, diisohexyl phthalate, heptyl nonyl phthalate, diisooctyl phthalate, bis(2-ethylhexyl) phthalate, (n-hexyl, n-octyl, n-decyl) phthalate, n-octyl, n-decyl) phthalate, diisodecyl phthalate, diundecyl phthalate, ditridecyl phthalate, butyl cyclohexyl phthalate, butyl benzyl phthalate, alkyl benzyl phthalate, 7-(2,6,6,8,-tetramethyl-4-oxa-3-oxo-nonyl) benzylphthalate, bis(2-butoxyethyl) phthalate, dicyclohexyl phthalate, and diphenyl phthalate, among others. Among the useful polyesters included are adipic acid polyesters, azelaic acid polyesters and sebacic acid polyester. Very highly preferred diluents are dialkyl phthalates. However, U.S. Pat. No. 5,872,193 provides no examples in which a specific plasticizer is named.

Phthalates and adipates are used in commercially available MDA-CC curing agents. U.S. Pat. No. 3,888,831 discloses that the curing of amine-curable polymers, such as polyurethane prepolymers, can be accelerated in the presence of plasticizers such as tetra-ethylene glycol bis-2-ethyl hexanoate and dipropylene glycol dibenzoate.

U.S. Pat. No. 4,207,128 discloses a process for producing microporous coatings comprising (1) mixing an NCO-prepolymer with 3 to 40% by weight based on the NCO-prepolymer of a plasticizer; (2) adding about 3 to 300 weight % of water to form a water-in-oil emulsion; (3) adding a polyamine in a quantity equivalent to the isocyanate groups; (4) applying a coating of the water-in-oil emulsion to a substrate; and (5) hardening the coating by evaporating the chemically unbound water from said coating. Plasticizers include phenol esters of long-chain sulphonic acids and phthalic acid esters, phosphoric acid esters, monocarboxylic acid esters, and chlorinated aromatic hydrocarbons.

Dipropylene glycol dibenzonate, commercially available, for example, as Benzoflex™ 9-88, is widely used as a plasticizer in preparing softer cast polyurethane elastomers. Although dipropylene glycol dibenzonate, and to a lesser extent other plasticizers, have found commercial success in elastomeric polyurethane production, there is room for improvement in plasticized compositions used in preparing high performance polyurethane elastomers. For example, there is a need for curing compositions, especially for forming high performance elastomers from LFM prepolymers and MDA-CC, with improved NCO stability that result in elastomers with less color and better overall physical properties.

Surprisingly, it has been found that particular plasticizers, when added to isocyanate capped prepolymers, provide compositions with increased prepolymer stability, improved processing characteristics, especially when curing with MDA-CCs to form polyurethane elastomers, and result in polyurethane elastomers with enhanced physical properties, relative to compositions comprising other similar plasticizers.

SUMMARY OF THE INVENTION

One broad embodiment of the invention provides an isocyanate capped polyurethane prepolymer composition comprising an isocyanate capped polyurethane prepolymer prepared from a diisocyanate monomer and a polyol and a plasticizer selected from mono-benzyl phthalate esters wherein one of the two phthalate ester groups is a benzyl ester and the other is carbonyloxy substituted alkyl ester, for example a compound of formula (I)

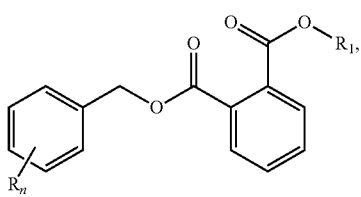

(I)

wherein n is a number from 0 to 4, each R is independently selected from $C_{1-4}$ alkyl, and $R_1$ is $C_{2-24}$ alkyl substituted by $C_{2-12}$ alkyl carbonyloxy. The prepolymer composition of the invention exhibits improved isocyanate stability over similar compositions containing other plasticizers.

In many embodiments the mono-benzyl phthalate is a compound of formula (III)

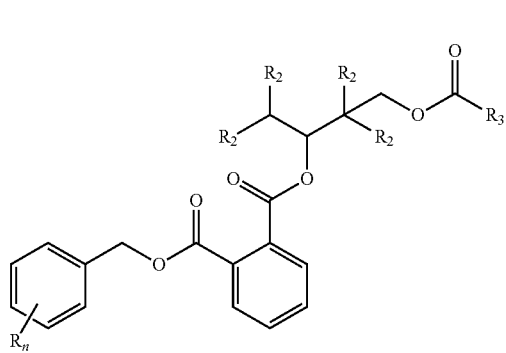

(III)

wherein n is 0, 1, 2, 3 or 4, R is $C_{1-4}$ alkyl, each $R_2$ is independently selected from the group consisting of H and $C_{1-6}$ alkyl, and $R_3$ is $C_{1-11}$ alkyl.

Another broad embodiment provides a method for improving the isocyanate stability and increasing the storage life of an isocyanate capped polyurethane prepolymer by adding the mono-benzyl phthalate above to a prepolymer or by preparing the prepolymer in the presence of the mono-benzyl phthalate.

In the present disclosure, the article "a" or "an" in relation to component means "one or more than one", unless otherwise specified, as is widely understood usage in US patent applications.

Also provided is a curing composition comprising an isocyanate capped polyurethane prepolymer, a phthalate of formula I, e.g., a phthalate of formula III, and a curing agent, e.g., a metal salt/methylene dianiline coordination complex (MDA-CC) curing agent, which composition exhibits improved isocyanate stability, better mix stability, and yields polyurethane elastomers with improved physical properties than similar compositions containing other plasticizers; and a method for improving the isocyanate stability and mix stability of a curing composition by preparing composition comprising the prepolymer, curing agent and phthalate of the invention.

Also provided is a high performance elastomeric polyurethane prepared from the above curing composition, which elastomeric polyurethane has lower compression set, better tensile and strength characteristics and lower unwanted color than when a plasticizer other than that of the invention is used; and a method for preparing the above high performance elastomeric polyurethane comprising adding a select benzyl alkylcarbonyloxyalkyl phthalate plasticizer to an isocyanate prepolymer or a composition comprising an isocyanate prepolymer and a curing agent, such as a MDA-CC curing agent.

It has also been found that the phthalates in the curing compositions of the invention are compatible with, and do not exude from, the polyurethane elastomers produced therefrom, and can be readily used in the preparation of softer polyurethane prepolymers having a Shore hardness of less than 90 A, such as 50 to 85 A, with improved physical properties when compared with other plasticizers. The selection of other plasticizers in common use in urethane compositions, including other phthalate plasticizers such as DIDP, do not provide compositions possessing the full range of properties found in the prepolymer and curing compositions of the invention.

For example, as seen in the Examples, the use of the common, commercially accepted plasticizer dipropylene glycol dibenzonate, place of the phthalate of the present invention, in the preparation of polyurethane elastomers with a hardness of less than 90 A or 85 A from curing compositions comprising a methylene dianiline/metal salt coordination complex and various LFM prepolymers containing very low levels off free isocyanate monomers, e.g., LFM prepolymers prepared from MDI and polyether, polycaprolactone, or co-polyester polyols can lead to processing and performance deficiencies, including poor NCO stability of the prepolymer plasticizer mixtures, mix stability with certain prepolymers, and poor color stability of the resulting elastomer.

DETAILED DESCRIPTION OF THE INVENTION

One broad embodiment of the invention provides a prepolymer composition having excellent isocyanate stability, comprising an isocyanate capped polyurethane prepolymer and from about 1 to about 50 wt % of a select benzyl alkylcarbonyloxyalkyl phthalate plasticizer, i.e. a mono-benzyl phthalate of formula (I) above, based on the combined weight of the prepolymer and mono-benzyl phthalate. More than one prepolymer and/or more than one mono-benzyl phthalate of formula (I) may be present in the prepolymer composition.

Another broad embodiment of the invention provides a curing composition, comprising an isocyanate capped polyurethane prepolymer, from about 1 to about 50 wt % of a select benzyl alkylcarbonyloxyalkyl phthalate plasticizer, i.e. a mono-benzyl phthalate of formula (I) above, based on the combined weight of the prepolymer and mono-benzyl phthalate, and a curing agent also referred to as a curative, which curing agent typically comprises a metal salt/methylene dianiline coordination complex (MDA-CC) curing agent. More than one prepolymer, mono-benzyl phthalate of formula (I) and/or curing agent may be present in the curing composition. Curing compositions of the invention containing as curatives only blocked curing agents, such as a MDA-CC, exhibit excellent storage stability when stored at temperatures below the deblocking temperature of the blocked curing agent.

In some embodiments, the mono-benzyl phthalate of formula (I) is present in either the prepolymer composition or curing composition in an amount from about 3 to about 45 wt %, such as from about 5 or 10 wt % to about 35 or 40 wt %, and in some embodiments from about 15 wt % to 45 or 50 wt %, based on the combined weight of the prepolymer and mono-benzyl phthalate.

The exact amount of curative present in the curing composition may vary and depends on the isocyanate content of the prepolymer composition, however, methods for determining the amount of curative to add are well within the skill of the average practitioner. In many embodiments of the present invention the molar ratio of prepolymers to curatives, for example, may be in the range of from 1:2 to 3:1, e.g., from 0.7:1 to 1.2:1 or from 1.1:1 to 0.9:1.

The select benzyl alkylcarbonyloxyalkyl phthalate plasticizer of the invention is a mono-benzyl phthalate of formula (I):

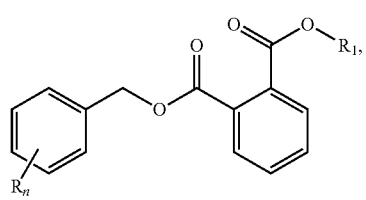

(I)

wherein n is a number from 0 to 4, e.g., 0, 1 or 2, and in certain embodiments n is 0, any R present is independently selected from $C_{1-4}$ alkyl, and $R_1$ is an alkyl group substituted by an alkylcarbonyloxy group, i.e., a $C_{2-24}$ alkyl, $C_{2-12}$ or $C_{4-10}$ alkyl groups, substituted by a $C_{2-12}$, $C_{2-6}$ or $C_{2-4}$ alkylcarbonyloxy group.

In some embodiments $R_1$ is bound to the phthalate oxygen atom at a secondary or tertiary carbon, for example, $R_1$ may be a group of formula (IIa):

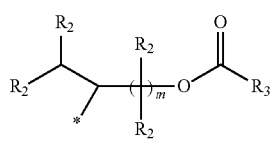

(IIa)

wherein * marks the point of attachment of R1 to the phthalate oxygen of formulae (I), each $R_2$ is independently selected from the group consisting of H and $C_{1-6}$ alkyl, $R_3$ is $C_{1-11}$ alkyl, and m is a number of from 1 to 6. For example, when m is 2, $R_1$ has a formula (IIa'). In some embodiments m is 2 and each $R_2$ group on the methylene bearing the alkylcarbonyloxy substituent is hydrogen and $R_1$ has a formula (IIb), e.g., the mono-benzyl phthalate is a compound of formula (III):

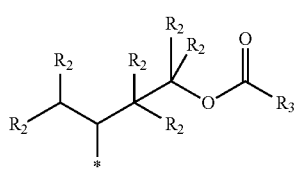

(IIa')

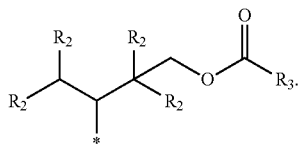

(IIb)

e.g., the mono-benzyl phthalate is a compound of formula (III):

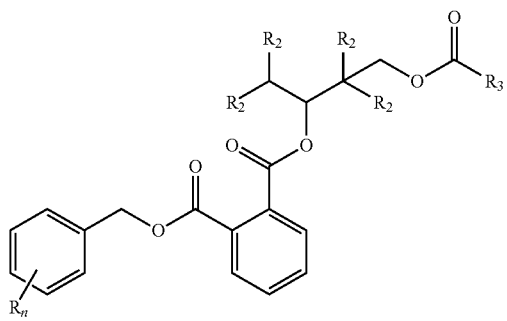

(III)

In particular embodiments, the mono-benzyl alkyl phthalate is a compound of formula (III) above wherein n is 0, e.g. a compound of formula (IV)

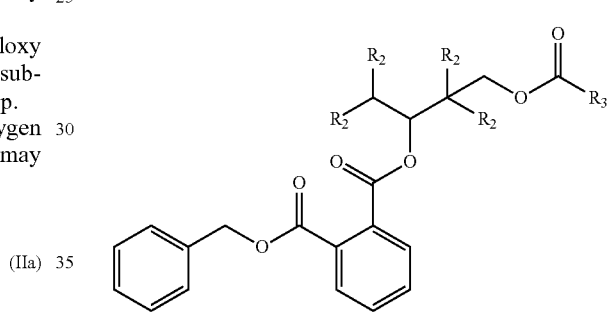

(IV)

wherein each $R_2$ is independently selected from the group consisting of H and $C_{1-6}$ alkyl, and $R_3$ is $C_{1-11}$ alkyl, e.g., $C_{1-6}$ alkyl.

In any of the above formulae, each alkyl and alkylcarbonyloxy may be linear or branched.

In particular embodiments, the mono-benzyl phthalate of the invention is a compound of formula (III) or (IV) wherein each $R_2$ is methyl, and $R_3$ is $C_{1-4}$ alkyl, e.g., $R_3$ is methylethyl or 2,2-dimethylethyl, and often $R_3$ is methylethyl. For example, in one particular embodiment, the select mono-benzyl phthalate plasticizer is benzyl texanol phthalate, i.e., 7-(2,6,6,8,-tetramethyl-4-oxa-3-oxo-nonyl) benzylphthalate.

Isocyanate capped urethane prepolymers of the invention are formed from the reaction of one or more diisocyanate monomers with one or more polyols. Such prepolymers, and methods for their preparation are well known in the art, many of which are commercially available.

The prepolymer of the invention is typically prepared using an excess of polyisocyanate, monomer, generally diisocyanate monomers are used, resulting in a prepolymer mixture containing unreacted monomer, e.g., unreacted or "free" diisocyanate. Levels of 20 wt % or more of free monomer may be encountered. In many embodiments of the invention, the amount of free diisocyanate in the prepolymer mixture is at a reduced level, e.g., less than 10 wt %, and in many embodiments the prepolymer mixture is a low free diisocyanate prepolymer mixture having free diisocyanate levels of less than 5 wt %, less than 3 wt %, less than 1 wt %, or less than 0.5 wt %. Such low free monomer prepolymers and methods for their preparation are also known in the art.

There is no particular restriction on the prepolymer, or mixture of prepolymers, that can be used in the present invention, nor is there a particular restriction on the polyols or isocyanate monomers that can be used in the preparation of the prepolymer. In some particular embodiments of the invention the prepolymer is prepared from a polyol having a number average molecular weight of 2,500 or less, e.g. 2,000 or less, e.g., a MW weight above 200 but less than 2,000, and in some particular embodiments the prepolymer is prepared from an aromatic isocyanate monomer, e.g., MDI.

Polyols used in the preparation of the prepolymers, for example, may comprise an alkane polyol, polyether polyol, polyester polyol, polycaprolactone polyol and/or polycarbonate polyol. Such polyols are well known in the art and more than one may be used. For example, in some embodiments the polyol comprises one or more polyether polyol, polyester polyol, polycaprolactone polyol and/or polycarbonate polyol. In many embodiments, prepolymers prepared from diols are preferred over those formed from triol or higher polyols.

Lactones and carbonates can be considered to be subsets of generic esters, however, polylactone polyols and polycarbonate polyols and prepolymers and polyurethanes prepared from them are associated in the art with particular properties, which are different from those of polyols based on polymers derivable from polyacids and polyols. For example, polycarbonate based polyurethanes are generally known as very tough, while certain widely used polylactone based polyurethanes has excellent water resistance. To allow for greater definition and to avoid confusion, in the present disclosure, 'polyester polyol' is used to refer to a polyol comprising moieties derivable from aliphatic or aromatic polyols and moieties derivable from aliphatic or aromatic polycarboxylate moieties, e.g.:

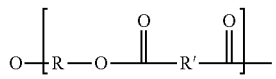

'polycaprolactone polyol' is used to refer to a polyol comprising moieties derivable from hydroxyl substituted aliphatic or aromatic mono-carboxylates, e.g.:

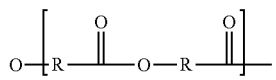

and 'polycarbonate polyol' is used to refer to a polyol comprising carbonate linkages, e.g.:

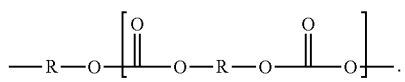

Polyether polyols include, e.g., polyalkylene ether polyols having the general formula $HO(RO)_nH$, wherein R is an alkylene radical and n is an integer large enough to provide the desired MW, e.g., a number average molecular weight of 200 to 6,000, e.g., from 400 to 3000 or from 1000 to 2500. Such polyalkylene ether polyols are well-known and can be prepared by the polymerization of cyclic ethers such as alkylene oxides and glycols, dihydroxyethers, and the like. Common polyether diols include, polyethylene ether glycols, polypropylene ether glycols, polytetramethylene ether glycols, mixed ether diols, such as ethylene glycol/propylene glycol ether copolymer diols, end capped polyether diols such as EO-capped polypropylene glycol, and the like.

Polyester polyols include, e.g., reaction products of adipic acid, succinic acid, isophthalic acid and other difunctional or multifunctional carboxylic acids with glycols, such as ethylene glycol, 1,2-propylene glycol, 1,3 propane diol, 1,4-butane diol, 1,3 butanediol, 1,6-hexane diol, diethylene glycol, tetramethylene ether glycol, and the like. More than one carboxylic acid or glycol may be used. Some polyester polyols also employ caprolactone and dimerized unsaturated fatty acids in their manufacture.

Useful polyester polyols, polycaprolactone polyols and polycarbonate polyols typically have a number average molecular weight of 200 to 6,000, e.g., from 400 to 3000 or from 1000 to 2500, and again, diols are typically preferred.

In some embodiments, the polyol comprises glycols or triols having molecular weights ranging, for example, from 60 to 400, e.g., from 80 to 300 or from 100 to 200. Such glycols or triols may include, for example, ethylene glycol, isomers of propylene glycol, isomers of butane diol, isomers of pentanediol, isomers of hexanediol, trimethylolpropane, pentaerythritol, diethylene glycol, triethylene glycol, dipropylene glycol, tripropylene glycol, etc.

While almost any polyisocyanate monomer may be used to prepare the prepolymer of the invention, the polyisocyate monomer typically comprises a di-isocyanate. Examples of common diisocyanates include diphenylmethane diisocyanate (MDI), polymeric MDI, toluene diisocyanate (TDI), para-phenylene diisocyanate (PPDI), diphenyl 4,4'-diisocyanate ("DPDI"), dibenzyl-4,4'-diisocyanate, naphthalene diisocyanate (NDI), benzophenone-4,4'-diisocyanate, 1,3 and 1,4-xylene diisocyanates, tetramethylxylylene diisocyanate (TMXDI), 1,6-hexane diisocyanate (HDI), isophorone diisocyanate (IPDI), 3,3'-bitoluene diisocyanate (TODI), 1,4-cyclohexyl diisocyanate (CHDI), 1,3-cyclohexyl diisocyanate, methylene bis(p-cyclohexyl isocyanate) ($H_{12}MDI$).

The exact polyols and isocyanate monomers used to prepare the prepolymers of the invention will vary depending on the end use of the final product. In some embodiments prepolymers prepared from aromatic isocyanates such as PPDI, MDI, TDI and the like will be preferred, in some embodiments prepolymers prepared from aliphatic isocyanates is such as HDI, $H_{12}MDI$, CHDI and the like will be preferred. In certain embodiments, the prepolymers are prepared by reaction one or more polyols with MDI.

Obviously, no attempt is made here to provide an exhaustive list of possible polyols, isocyanate monomers or prepolymers useful for the practice of the invention.

In one particular embodiment, the prepolymer is an MDI terminated prepolymer prepared using a polyether, polyester, polylactone or polycarbonate diol, the prepolymer often comprising less than 10 wt %, less than 5 wt %, less than 3 wt %, less than 1 wt % or less than 0.5 wt % of free MDI. In general, the free isocyanate present in the prepolymer accounts for 80 to 100%, typically 90 to 100%, and in some embodiments 100%, of the free isocyanate in the curing composition.

In many embodiments of the invention, the curative of the curing composition is a blocked curative, for example, a methylenedianiline metal salt coordination complex. Methylenedianiline metal salt coordination complexes of the invention and their use as curatives are known, e.g., the 3:1 NaCl:MDA complex is commercially available and is widely used in the industry. Other curatives may be used and mixtures of curatives may be employed, however in particular embodiments at least 80 wt % and typically more, e.g., 90 or 95 to 100% of the curing agent is a MDA-CC. The exact amount of curative present in the composition may vary and depends on the isocyanate content of the prepolymer composition, however, methods for determining the amount of curative to add are well within the skill of the average practitioner. In many embodiments of the present invention the molar ratio of prepolymers to curatives, for example, may be in the range of from 1:2 to 3:1, e.g., from 0.7:1 to 1.2:1 or from 1.1:1 to 0.9:1.

The prepolymer composition of the invention can be prepared by combining an isocyanate terminated prepolymer and the mono-benzyl phthalate of the invention, or the prepolymer can be prepared by reacting the polyol and polyisocyanate monomer in the presence of the mono-benzyl phthalate.

In preparing the curing composition of the invention, the components can be combined in any order or in any manner. For example, the curative can be mixed with a composition already comprising the mono-benzyl phthalate and prepolymer, e.g., adding the curative to the prepolymer composition prepared above, the mono-benzyl phthalate can be added to a mixture already comprising the prepolymer and curative, the prepolymer can be mixed with a composition already comprising the mono-benzyl phthalate and curative, or a mixture comprising the prepolymer and mono-benzyl phthalate and be mixed with a mixture comprising a curative and mono-benzyl phthalate. Generally, at least a part of the total amount of the mono-benzyl phthalate present in the curing composition is present in a prepolymer composition prior to mixing the prepolymer composition with the curative.

Other components can be present in the prepolymer or curing composition including solvents, lesser amounts of other plasticizers, colorants and additives common in the art. Any plasticizer other than the mono-benzyl phthalate of the invention that may be present in the composition will be at a much lower concentration than the mono-benzyl phthalate of the invention, e.g., less than 20 wt % or less than 10 or 5 wt %, and in many embodiments, the only plasticizer present will be the mono-benzyl phthalate of the invention.

The prepolymer compositions of the invention have good storage capabilities and are stable at temperatures up to 70° C. and often higher for at least 2 days and often longer. As shown in the Examples, compositions comprising a low free isocyanate monomer MDI/co-polyester prepolymer, MDI/polycaprolactone prepolymer, or MDI/polyether prepolymer and 20 wt % of a mono-benzyl phthalate plasticizer of the invention, i.e., benzyl texanol phthalate, demonstrated significantly lower losses of isocyanate than compositions comprising the same prepolymers and 20 wt % of the widely used plasticizer dipropylene glycol dibenzoate. A two to four-fold improvement in heat stability was observed for each composition of the invention when compared to compositions comprising the same prepolymers blended with the benzoate plasticizer.

The storage properties of the prepolymer compositions are important because the properties of cast elastomers are generally reduced when the relative NCO of the prepolymer declines. Many customers prefer to purchase prepolymer/plasticizer compositions to simplify their operations. The improved heat stability of the prepolymer compositions comprising a select benzyl alkylcarbonyloxyalkyl phthalate plasticizer of the invention is therefore a considerable advantage for cast urethane processors who melt and store the materials before use.

The curing composition of the invention can also be stored under standard conditions without degradation or premature reaction and can be used in a commercial one pack polyurethane product. For example, a composition comprising an isocyanate capped polyurethane prepolymer, from about 1 to about 50 wt % of a mono-benzyl phthalate of formula (I) above, and a metal salt/methylene dianiline coordination complex as the curing agent has excellent stability when stored at room temperature.

The curing composition of the invention is also more stable during processing, especially at elevated temperatures, than similar compositions comprising other commercially available plasticizers. For example, compositions for preparing polyurethane elastomers, such as the present curing composition, are often processed at elevated temperatures, e.g., 70° C., to keep the mixture flowable to allow for good handling, e.g., to ensure proper filling of a mold.

In one series of tests, the copolyester, polycaprolactone, and polyether prepolymers from above were each blended with 30 wt % a select mono-benzyl phthalate plasticizer of the invention, and also with 30 wt % of a commercial benzoate plasticizer. The blends were heated to 70° C. and a sodium chloride/methylenedianiline coordination complex was added as curing agent. The initial viscosity of each resulting mixture was measured. The mixtures were held at 70° C. and the viscosity of each was again measured after 4 and 24 hours. As seen in the Examples, the compositions of the invention maintained a lower viscosity than the compositions containing the benzoate plasticizer. The viscosities of the compositions of the invention containing the caprolactone or polyether prepolymer remained remarkably lower than the analogous compositions prepared with the benzoate plasticizer. For example, the viscosity of a caprolactone curing composition comprising MDA-CC and dipropylene glycol dibenzoate increased from 738 cP to over 500,000 cP over 24 hours, whereas the viscosity of the analogous caprolactone curing composition comprising MDA-CC and benzyl texanol phthalate increased from 825 cP to only 1010 cP over the same period. Analogous curing compositions comprising dibutoxy ethoxy ethyl adipate (DBEEA) as plasticizer could not be stored under these conditions, forming very viscous mixtures immediately and which cured to elastomeric materials in less than 4 hours.

The improved pot life of curing compositions of the present invention is also a significant advantage for cast urethane processors allowing them to prepare a large tank of the curing composition at working temperatures and feed it to equipment over extended periods of time, which could be hours or days and in some cases, weeks.

Other broad embodiments of the invention provide polyurethane elastomers with excellent physical properties obtained from the inventive curing compositions, and a process for preparing the elastomers. Elastomeric polyurethanes produced according to the invention, i.e., elastomers prepared from the inventive curing compositions, have surprisingly improved physical properties and performance characteristics over analogous elastomeric polyurethanes produced from composition comprising other common plasticizers. Particular embodiments provide elastomeric polyurethanes having a Shore hardness of 90 A, 85 A or lower, e.g., a Shore Hardness of from 10 A, 20 A, 30 A, 40 A, 50 A, 60 A or 70 A to 85 A, for example 50A to 85 A, 60 A to 85 A, or 70 A to 85 A, for example 50A to 84 A, 60 A to 84 A, or 70 A to 84 A.

Significantly, it has been found that even when stable, compatible curing compositions can be prepared using plasticizers outside the select mono-benzyl phthalates of the invention, the resulting polyurethane elastomer is, in many cases, incompatible with the plasticizer, as seen by plasticizer exudation from the elastomer, and/or the resulting elastomer experiences inferior physical properties.

For example, diisodecyl phthalate (DIDP) is a common phthalate that finds use in urethane compositions and forms stable curing compositions with many prepolymers and MDA-CC. However, unlike the select plasticizers of the invention, exudation from polyurethane elastomers can be a problem for DIDP. For example, stable curing compositions analogous to those found in the present examples comprising DIDP, methylene dianiline/NaCl coordination complex and either a low free monomer co-polyester/MDI prepolymer or polycaprolactone/MDI prepolymer, but DIDP exudes from the polyurethane elastomer upon curing, whereas the plasticizer of the invention does not.

The Examples clearly demonstrate that polyurethane elastomers with a shore hardness of 85 A or less, prepared from either a commercially available co-polyester/MDI prepolymer, polycaprolactone/MDI prepolymer, or polyether/MDI prepolymer, by curing with a methylene dianiline/NaCl coordination complex in the presence of a select monobenzyl plasticizer of the invention, exhibit lower compression set values, higher break strength, and lower color than analogous polyurethane elastomers prepared by curing the same prepolymers with the same methylene dianiline/NaCl coordination complex in the presence of dipropylene glycol dibenzoate as plasticizer.

Another broad embodiment of the invention provides a method for preparing stable prepolymer composition, preparing stable urethane curing compositions, preparing polyurethane elastomer compositions as described above and further illustrated for specific case in the Examples.

It was found that the benzyl alkylcarbonyloxyalkyl phthalate plasticizers of the invention form stable compositions with prepolymers, form stable curing compositions with prepolymers and curatives, e.g., MDA-CC curatives, are compatible with polyurethane elastomers and provide excellent physical elastomer properties. For example, the present plasticizers form stable prepolymer compositions with prepolymers derived from aromatic isocyanate monomers, such as MDI, PPDI, TDI and like, e.g., MDI and PPDI, in particular MDI, including low free monomer prepolymers, form stable curing compositions comprising the prepolymers and a curative, e.g., a MDA-CC curative, are compatible with, and do not exude from elastomers prepared from the curing compositions, and can be readily used in the preparation of polyurethane elastomers having a Shore hardness of less than 90 A, such as 50 to 85 A, with improved physical properties, for example, the soft elastomers prepared from the inventive curing compositions. Other plasticizers in common use in urethane compositions, including other phthalate plasticizers such as DIDP, do not possess this full range of properties.

EXAMPLES

The following examples use the commercially available polymers:

Adiprene™ Duracast™ S850 polyester/MDI prepolymer—abbreviated as S850;

Adiprene™ Duracast™ C900 polycaprolactone/MDI prepolymer—abbreviated as C900; and Adiprene™ Duracast™ E900 polyether/MDI prepolymer—abbreviated as E900.

In the following tables, "benzoate" refers to the plasticizer dipropylene glycol dibenzoate and "INV-Pht" refers to the plasticizer benzyl texanol phthalate.

Example 1

This example compares the NCO stability of the co-polyester/MDI prepolymer Adiprene™ Duracast™ 5850, the polycaprolactone/MDI prepolymer Adiprene™ Duracast™ C900, and the polyether/MDI prepolymer Adiprene™ Duracast™ E900 when blended with a commercially available benzyl texanol phthalate plasticizer Santicizer™ 278, to the prepolymer when blended with a commercially available dipropylene glycol dibenzoate plasticizer Benzoflex™ 9-88.

Each prepolymer was blended with 20% by weight of each of the two plasticizers. The initial NCO was measured. The samples were charged to eight-ounce glass jars, packaged in a sealed can over desiccant and heat aged for one week at 70° C. The NCO of the prepolymer plasticizer blend was measured after heat aging.

TABLE 1

NCO Stability of Prepolymer Plasticizer Blends

| Prepolymer | E 900 | E 900 | S 850 | S 850 | C 900 | C 900 |
|---|---|---|---|---|---|---|
| Plasticizer | Benzoate | INV-Pht | Benzoate | INV-Pht | Benzoate | INV-Pht |
| T0 NCO (%) | 2.448 | 2.540 | 2.192 | 2.217 | 2.820 | 2.915 |
| Aged NCO (%) | 2.172 | 2.460 | 1.845 | 2.135 | 2.339 | 2.781 |
| Change (%) | −11.23 | −4.49 | −15.83 | −3.70 | −17.06 | −4.60 |

The results show that the prepolymers blended with the benzyl texanol phthalate plasticizer of the invention have a two to four-fold improvement in heat stability when compared to the same prepolymers blended with a benzoate plasticizer.

Examples 2-5 show that curing compositions of the invention exhibit a longer pot life when heated at processing temperatures, i.e., temperatures at which the fluid composition is cast, e.g., cast into a mold, and yields an elastomer with improved compression set, improved tensile properties and lower color than analogous curing compositions prepared with other commercially available plasticizers such as the commercial standard dipropylene glycol dibenzoate.

Example 2

The pot life of curing compositions made with the prepolymers and benzyl texanol phthalate plasticizer of Example 1, was compared to curing compositions made with the prepolymers and dipropylene glycol dibenzoate plasticizer of Example 1.

Each prepolymer was blended with 30% by weight plasticizer and heated to 70° C. DURACAST C3-LF, a sodium chloride/methylenedianiline coordination complex curing agent, abbreviated herein as C3-LF, was added to the blend, such that the equivalent ratio of NH$_2$/NCO=0.95. The initial viscosity of the mixture was measured. The mixture was poured into an eight-ounce glass jar and heat aged at 70° C. The viscosity of the mixture was measured after 4 and 24 hours of heat aging at 70° C.

TABLE 2

| Pot Life of Curing Compositions | | | | | | |
|---|---|---|---|---|---|---|
| Prepolymer | E 900 | E 900 | S 850 | S 850 | C 900 | C 900 |
| Plasticizer | Benzoate | INV-Pht | Benzoate | INV-Pht | Benzoate | INV-Pht |
| Curative | C3-LF | C3-LF | C3-LF | C3-LF | C3-LF | C3-LF |
| T0 Visc. (cP) | 2190 | 840 | 2623 | 1993 | 738 | 825 |
| T4 Visc. (cP) | 3450 | 920 | 2328 | 2080 | 995 | 905 |
| T24 Visc. (cP) | >500,000 | 1162 | 3200 | 2285 | >500,000 | 1010 |

The results show that curing compositions made using benzyl texanol phthalate plasticizer have longer pot life than those made from a benzoate plasticizer. In the cases of C 900 and E 900 the differences are remarkable.

Example 3

The compression set of elastomers softened with the benzyl texanol phthalate of the invention were compared to that of elastomers softened with dipropylene glycol dibenzoate plasticizer.

Each the prepolymers of example 1 were blended with the indicated amount and type of plasticizer shown in Tables 3, 4 and 5, and heated to 70° C. C3-LF was added to the blend, such that the equivalent ratio of $NH_2/NCO=0.95$. The curing composition was poured into a 120° C. mold and post cured for 24 hours at 140° C. The compression set buttons were tested according to ASTM D-395 Method B. Compression set measures the ability of an elastomer to retain its elastic properties during prolong action of compressive forces. The lower the compression set the better the elastomer retains its elastic properties (less permanent deformation or viscous flow). Low compression set is important applications such as seals, machinery mounts and vibration dampening.

TABLE 3

| S 850 Compression Set | | | | | | | |
|---|---|---|---|---|---|---|---|
| Prepolymer | S 850 | S 850 | S 850 | S 850 | S 850 | S 850 | S 850 |
| Plasticizer | None | Benzoate | Benzoate | Benzoate | INV-Pht | INV-Pht | INV-Pht |
| Plasticizer wt. % | None | 15 | 22.5 | 30 | 15 | 22.5 | 30 |
| Comp. Set % | 20.4 | 28.7 | 29.1 | 31.9 | 21.7 | 20.9 | 21.7 |
| Hardness | 85A | 77A | 73A | 67A | 78A | 74A | 71A |

TABLE 4

| C 900 Compression Set | | | | | | | |
|---|---|---|---|---|---|---|---|
| Prepolymer | C 900 | C 900 | C 900 | C 900 | C 900 | C 900 | C 900 |
| Plasticizer | None | Benzoate | Benzoate | Benzoate | INV-Pht | INV-Pht | INV-Pht |
| Plasticizer wt. % | None | 15 | 22.5 | 30 | 15 | 22.5 | 30 |
| Comp. Set % | 22.4 | 25.5 | 29.6 | 32.9 | 18.5 | 18.3 | 17.8 |
| Hardness | 89A | 85A | 81A | 77A | 85A | 82A | 78A |

TABLE 5

| E 900 Compression Set | | | | | | | |
|---|---|---|---|---|---|---|---|
| Prepolymer | E 900 | E 900 | E 900 | E 900 | E 900 | E 900 | E 900 |
| Plasticizer | None | Benzoate | Benzoate | Benzoate | INV-Pht | INV-Pht | INV-Pht |
| Plasticizer wt. % | None | 15 | 22.5 | 30 | 15 | 22.5 | 30 |
| Comp. Set % | 26.0 | 27.8 | 30.1 | 29.7 | 23.9 | 22.9 | 23.1 |
| Hardness | 88A | 82A | 78A | 74A | 82A | 79A | 76A |

The results in Tables 3 to 5 show the surprising result that elastomers softened with the mono-benzyl phthalate plasticizer of the invention have remarkably good compression set. Typical urethane elastomers have compression set values in the 25 to 50% range. The non-plasticized elastomers made from S 850, C 900 and E 900, and MDA-CC have good compression set values. When these materials are softened with the benzoate ester plasticizer the compression set increases. It is remarkable that the compression set resistance of the elastomers softened with benzyl texanol phthalate plasticizer are not negatively affected (higher compression set) or are even improved by its addition.

Example 4

The tensile properties of elastomers softened with the benzyl texanol phthalate of the invention were compared to those of elastomers softened with dipropylene glycol dibenzoate plasticizer.

Each the prepolymers of example 1 were blended with the indicated amount and type of plasticizer shown in Tables 6, 7 and 8, and heated to 70° C. C3-LF was added to the blend, such that the equivalent ratio of $NH_2/NCO=0.95$. The curing composition was poured into a 120° C. mold and post cured for 24 hours at 140° C. The dumbbell specimens were tested according to ASTM D-412 Method A. The addition of plasticizer to elastomers typically weakens the compound, which can be measured by stress/strain properties of the compound.

TABLE 6

S 850 Tensile Properties

| Prepolymer | S 850 | S 850 | S 850 | S 850 | S 850 | S 850 | S 850 |
|---|---|---|---|---|---|---|---|
| Plasticizer | None | Benzoate | Benzoate | Benzoate | INV-Pht | INV-Pht | INV-Pht |
| Plasticizer wt. % | None | 15 | 22.5 | 30 | 15 | 22.5 | 30 |
| 100% M (psi) | 704 | 493 | 449 | 324 | 540 | 482 | 396 |
| 300% M (psi) | 1020 | 679 | 614 | 438 | 803 | 735 | 590 |
| % Elongation | 735 | >1000 | >1000 | 951 | 864 | 859 | 976 |
| Break (psi) | 6228 | 2813 | 2156 | 685 | 5135 | 4775 | 3966 |
| Hardness | 85A | 77A | 73A | 67A | 78A | 74A | 71A |

TABLE 7

C 900 Tensile Properties

| Prepolymer | C 900 | C 900 | C 900 | C 900 | C 900 | C 900 | C 900 |
|---|---|---|---|---|---|---|---|
| Plasticizer | None | Benzoate | Benzoate | Benzoate | INV-Pht | INV-Pht | INV-Pht |
| Plasticizer wt % | None | 15 | 22.5 | 30 | 15 | 22.5 | 30 |
| 100% M (psi) | 1054 | 811 | 708 | 582 | 828 | 717 | 624 |
| 300% M (psi) | 1375 | 1045 | 904 | 745 | 1157 | 999 | 884 |
| % Elongation | 639 | 819 | 929 | >1000 | 741 | 970 | 800 |
| Break (psi) | 7100 | 5504 | 4361 | 2892 | 5940 | 5287 | 4291 |
| Hardness | 89A | 85A | 81A | 77A | 85A | 82A | 78A |

TABLE 8

E 900 Tensile Properties

| Prepolymer | E 900 | E 900 | E 900 | E 900 | E 900 | E 900 | E 900 |
|---|---|---|---|---|---|---|---|
| Plasticizer | None | Benzoate | Benzoate | Benzoate | INV-Pht | INV-Pht | INV-Pht |
| Plasticizer wt. % | None | 15 | 22.5 | 30 | 15 | 22.5 | 30 |
| 100% M (psi) | 1017 | 779 | 656 | 519 | 814 | 720 | 614 |
| 300% M (psi) | 1366 | 1026 | 862 | 714 | 1131 | 1037 | 898 |
| % Elongation | 650 | 926 | 935 | 896 | 740 | 784 | 822 |
| Break (psi) | 6931 | 5631 | 3862 | 2519 | 6807 | 6126 | 5446 |
| Hardness | 88A | 82A | 78A | 74A | 82A | 79A | 76A |

The data in Tables 6, 7 and 8 show the surprising result that elastomers softened with benzyl texanol phthalate plasticizer are stronger than elastomers softened with the benzoate plasticizer, in particular at the higher plasticizer loading.

Example 5

This example demonstrates the improved (lower) color of elastomers softened with the mono-benzyl phthalate of the invention when compared to elastomers softened with dipropylene glycol dibenzoate plasticizer. It also demonstrates that the plasticizer of the invention is compatible with the elastomers at least up to 30% by weight.

Each of the prepolymers of Example 1 were blended with 30% by weight of the indicated plasticizer, see table 9, and heated to 70° C. C3-LF was added to the blend, such that the equivalent ratio of $NH_2/NCO=0.95$. The curing composition was poured into a 120° C. mold and post cured for 24 hours at 140° C. The elastomers were inspected for color and for compatibility by observing surface characteristics; results are shown in Table 9.

TABLE 9

Elastomer Color and Compatibility.

| Prepolymer | E 900 | E 900 | S 850 | S 850 | C 900 | C 900 |
|---|---|---|---|---|---|---|
| Plasticizer | Benzoate | INV-Pht | Benzoate | INV-Pht | Benzoate | INV-Pht |
| Color | Dark Yellow | Off White | Very Dark Yellow | Light Yellow | Yellow | Off white |
| Surface | Smooth | Smooth | Smooth | Smooth | Cracked | Smooth |

What is claimed is:

1. A composition comprising:
   (a) an isocyanate capped prepolymer prepared from a diisocyanate monomer and a polyol; and
   (b) from about 1 to about 50 wt % of a mono-benzyl phthalate plasticizer of formula (I), based on the combined weight of the prepolymer and mono-benzyl phthalate,

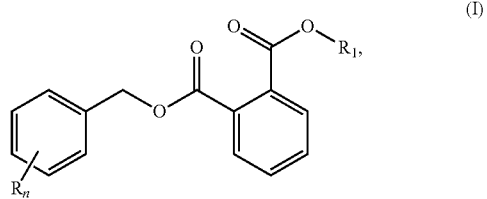

(I)

wherein n is a number from 0 to 4, each R is independently selected from $C_{1-4}$ alkyl, and $R_1$ is a $C_{2-24}$ alkyl group substituted by a $C_{2-12}$, alkylcarbonyloxy group.

2. The composition according to claim 1 wherein $R_1$ in formula I is a group of formula (IIa):

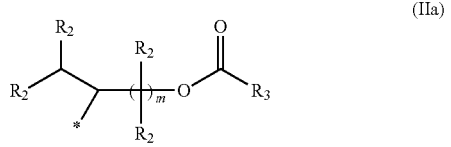

(IIa)

wherein * marks the point of attachment of $R_1$ to the phthalate oxygen of formula (I), each $R_2$ is independently selected from the group consisting of H and $C_{1-6}$ alkyl, $R_3$ is $C_{1-11}$ alkyl, and m is a number of from 1 to 6.

3. The composition according to claim 1 wherein the mono-benzyl phthalate plasticizer is a compound of formula (IV):

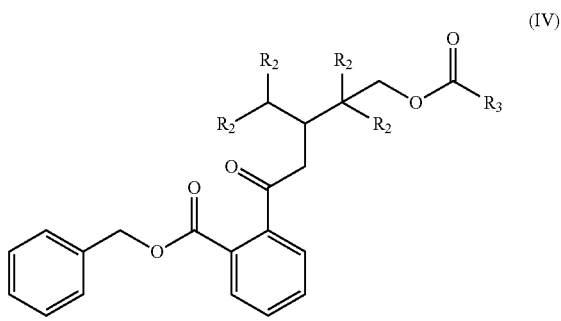

(IV)

wherein each $R_2$ is independently selected from the group consisting of H and $C_{1-6}$ alkyl and $R_3$ is $C_{1-11}$ alkyl.

4. The composition according to claim 3 wherein in formula (IV) $R_3$ is $C_{1-5}$ alkyl.

5. The composition according to claim 4 wherein each $R_2$ is methyl, and $R_3$ is $C_{1-4}$ alkyl.

6. The composition according to claim 1 wherein the isocyanate capped prepolymer comprises less than 5 wt % free isocyanate monomer.

7. The composition according to claim 1 wherein the isocyanate capped prepolymer is prepared from diphenylmethane diisocyanate and a polyol.

8. The composition according to claim 7 further comprising a curing agent.

9. The composition according to claim 8 wherein the curing agent is a metal salt coordination complex of methylene dianiline.

10. The composition according to claim 1 further comprising a curing agent.

11. The composition according to claim 10 wherein the curing agent is a metal salt coordination complex of methylene dianiline.

12. An elastomeric polyurethane obtained by curing the composition of claim 8.

13. An elastomeric polyurethane obtained by curing the composition of claim 9.

14. The elastomeric polyurethane according to claim 13 having a Shore hardness of from 50A to 85 A.

15. An elastomeric polyurethane obtained by curing the composition of claim 10.

16. An elastomeric polyurethane obtained by curing the composition of claim 11.

17. The elastomeric polyurethane according to claim 16 having a Shore hardness of from 50A to 85 A.

18. A method of preparing a polyurethane elastomer, the method comprising the steps of preparing a composition according to claim 9 and heating the composition to deblock the methylenedianiline/metal salt coordination complex and cure the composition to form the polyurethane elastomer.

19. The method according to claim 18 wherein the elastomeric polyurethane has a Shore hardiness of from 50A to 85A.

20. A method of preparing a polyurethane elastomer, the method comprising the steps of preparing a composition according to claim 11 and heating the composition to deblock the methylenedianiline/metal salt coordination complex and cure the composition to form the polyurethane elastomer.

* * * * *